(12) United States Patent
Bai et al.

(10) Patent No.: US 11,127,292 B2
(45) Date of Patent: Sep. 21, 2021

(54) METHODS AND APPARATUS FOR DETETERMINING LANE-LEVEL STATIC AND DYNAMIC INFORMATION

(71) Applicant: GM GLOBAL TECHNOLOGY OPERATIONS LLC, Detroit, MI (US)

(72) Inventors: Fan Bai, Ann Arbor, MI (US); Shu Chen, Rochester Hills, MI (US); Donald K. Grimm, Utica, MI (US); Jinzhu Chen, Troy, MI (US); Bo Yu, Troy, MI (US); David E. Bojanowski, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 203 days.

(21) Appl. No.: 16/251,669

(22) Filed: Jan. 18, 2019

(65) Prior Publication Data
US 2020/0234585 A1     Jul. 23, 2020

(51) Int. Cl.
| | | |
|---|---|---|
| *G08G 1/0967* | (2006.01) | |
| *G08G 1/01* | (2006.01) | |
| *G05D 1/00* | (2006.01) | |
| *G05D 1/02* | (2020.01) | |

(52) U.S. Cl.
CPC ..... *G08G 1/096725* (2013.01); *G05D 1/0088* (2013.01); *G05D 1/0248* (2013.01); *G05D 1/0276* (2013.01); *G08G 1/0112* (2013.01); *G08G 1/0133* (2013.01); *G08G 1/0145* (2013.01); *G05D 2201/0213* (2013.01)

(58) Field of Classification Search
CPC .......... G08G 1/096725; G08G 1/0112; G08G 1/0133; G08G 1/0145; G05D 1/0088; G05D 1/0248; G05D 1/0276; G05D 2201/0213
See application file for complete search history.

(56) References Cited

U.S. PATENT DOCUMENTS

| | | | |
|---|---|---|---|
| 2017/0008521 A1* | 1/2017 | Braunstein | ............ B60W 30/18 |
| 2018/0182238 A1* | 6/2018 | Fowe | ................... G08G 1/0129 |
| 2019/0243371 A1* | 8/2019 | Nister | ................... G05D 1/0214 |

\* cited by examiner

*Primary Examiner* — James J Lee
*Assistant Examiner* — Steven Vu Nguyen
(74) *Attorney, Agent, or Firm* — Lorenz & Kopf LLP (57) ABSTRACT

Methods and apparatus are provided for controlling a vehicle. In one embodiment, a method includes: receiving, by a processor, vehicle position data from the vehicle; processing, by the processor, vehicle position data with vehicle position data from other vehicles to determine a lane topology; processing, by the processor, the vehicle position data to determine traffic conditions within a lane of the lane topology; generating, by the processor, a map for controlling the vehicle based on the lane topology and the traffic conditions.

17 Claims, 5 Drawing Sheets

METHODS AND APPARATUS FOR DETETERMINING LANE-LEVEL STATIC AND DYNAMIC INFORMATION

INTRODUCTION

The technical field generally relates to methods and systems for mapping lane level information, and more particularly relates to methods and systems for mapping lane level information using global positioning system information from one or more vehicles.

Autonomous and semi-autonomous vehicles make use of mapping information to control one or more components of the vehicle. Maps are typically generated based on data obtained from survey vehicles that traverse the road network and capture the data. These maps take time to produce. In addition, these maps become quickly out of date due to road construction and other changes to the road network.

Accordingly, it is desirable to provide improved methods and systems for mapping lane level information. Furthermore, other desirable features and characteristics of the present invention will become apparent from the subsequent detailed description and the appended claims, taken in conjunction with the accompanying drawings and the foregoing technical field and background.

SUMMARY

Methods and apparatus are provided for controlling a vehicle. In one embodiment, a method includes: receiving, by a processor, vehicle position data from the vehicle; processing, by the processor, vehicle position data with vehicle position data from other vehicles to determine a lane topology; processing, by the processor, the vehicle position data to determine traffic conditions within a lane of the lane topology; generating, by the processor, a map for controlling the vehicle based on the lane topology and the traffic conditions.

In various embodiments, the processing the vehicle position data with the vehicle position data from the other vehicles to determine the lane topology includes: pre-processing, by the processor, the vehicle position data; dilating, by the processor, the pre-processed vehicle position data; aggregating, by the processor, the dilated, pre-processed vehicle position data with pre-processed vehicle position data from the other vehicles; clustering, by the processor, the aggregated vehicle position data to determine lanes; correcting, by the processor, the road geometry of the determined lanes based on the yaw rate of the vehicle and vehicle position data; and determining, by the processor, the lane topology based on the corrected road geometry of the determined lanes.

In various embodiments, the method further includes applying constraints to the clustered vehicle position data, and the correcting the road geometry is based on the constrained clustered vehicle position data. In various embodiments, the constraints are compared to data obtained from a camera or a lidar of the vehicle. In various embodiments, the constraints include weights that are applied to the vehicle position data.

In various embodiments, the vehicle position data includes latitude and longitude traces of the vehicle from a global positioning system. In various embodiments, the traffic conditions include temporal-spatial conditions based on a history of traffic conditions. In various embodiments, the traffic conditions include an indication of traffic congestion. In various embodiments, the traffic conditions further include detected lane changes.

In another embodiment, a system includes: a global positioning system that generates vehicle position data; and a control module that, by a processor, receives the vehicle position data, processes the vehicle position data with vehicle position data from other vehicles to determine a lane topology, processes the vehicle position data to determine traffic conditions within a lane of the lane topology, generates a map for controlling the vehicle based on the lane topology and the traffic conditions.

In various embodiments, the control module processes the vehicle position data with the vehicle position data from the other vehicles to determine the lane topology by: pre-processing, by the processor, the vehicle position data; dilating, by the processor, the pre-processed vehicle position data; aggregating, by the processor, the dilated, pre-processed vehicle position data with pre-processed vehicle position data from the other vehicles; clustering, by the processor, the aggregated vehicle position data to determine lanes; correcting, by the processor, the road geometry of the determined lanes based on a yaw rate of the vehicle and vehicle position data; and determining the lane topology based on the corrected road geometry of the determined lanes.

In various embodiments, the control module applies constraints to the clustered vehicle position data, and corrects the road geometry based on the constrained clustered vehicle position data. In various embodiments, the constraints are compared to data obtained from a camera or a lidar of the vehicle. In various embodiments, the constraints include weights that are applied to the vehicle position data. In various embodiments, the vehicle position data includes latitude and longitude traces of the vehicle from a global positioning system. In various embodiments, the traffic conditions include temporal-spatial conditions based on a history of traffic conditions.

In various embodiments, the traffic conditions include an indication of traffic congestion. In various embodiments, the traffic conditions include detected lane changes.

In another embodiment, a vehicle includes: a vehicle positioning system that provides vehicle position data; a communication system that receives vehicle position data from other vehicles; and a control module that, by a processor, receives the vehicle position data, processes the vehicle position data with vehicle position data from other vehicles to determine a lane topology, processes the vehicle position data to determine traffic conditions within a lane of the lane topology, generates a map for controlling the vehicle based on the lane topology and the traffic conditions.

In various embodiments, the control module processes the vehicle position data with the vehicle position data from the other vehicles to determine the lane topology by: pre-processing, by the processor, the vehicle position data; dilating, by the processor, the pre-processed vehicle position data; aggregating, by the processor, the dilated, pre-processed vehicle position data with pre-processed vehicle position data from the other vehicles; clustering, by the processor, the aggregated vehicle position data to determine lanes; correcting, by the processor, the road geometry of the determined lanes based on a yaw rate of the vehicle; and determining the lane topology based on the corrected road geometry of the determined lanes.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
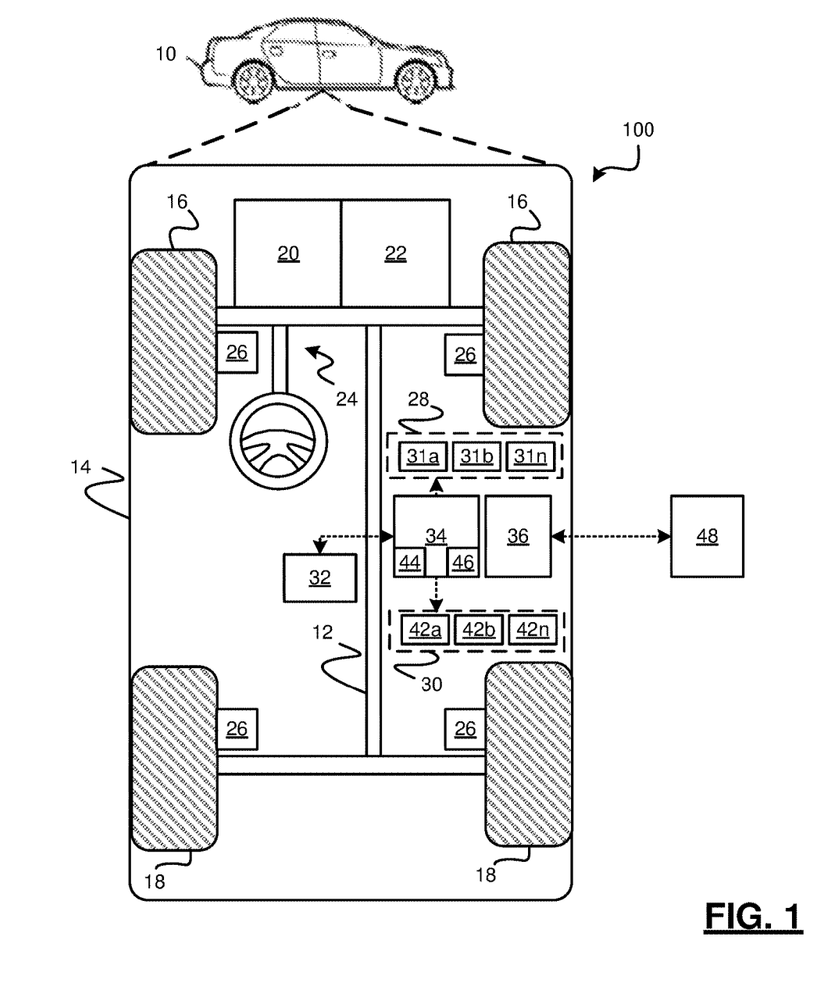
FIG. 1 is an illustration of a vehicle having a mapping system in accordance with various embodiments.

With reference to FIG. 1, a mapping system shown generally as 100 is associated with a vehicle 10 in accordance with various embodiments. In general, the mapping system (or simply "system") 100 generates map data including static and dynamic lane level information for use in controlling the vehicle 10. In various embodiments, the mapping system 100 generates the map data based on information obtained from a positioning system of the vehicle 10 and/or from positioning information received from other vehicles (not shown).

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle or a semi-autonomous vehicle. As can be appreciated, the mapping system 100 can be implemented in other non-autonomous systems and is not limited to the present embodiments. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, an actuator system 30, at least one data storage device 32, at least one controller 34, and the communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel for illustrative purposes, in some embodiments contemplated within the scope of the present disclosure, the steering system 24 may not include a steering wheel.

The sensor system 28 includes one or more sensing devices 31a-31n that sense observable conditions of the exterior environment and/or the interior environment of the vehicle 10 (such as the state of one or more occupants). In various embodiments, the sensing devices 31a-31n include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter. The sensor system 28 provides information for determining a location of the vehicle 10.

The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touchscreen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps are generated by the mapping system 100 and include static and dynamic lane level information as will be discussed in more detail below.

Figure 2:
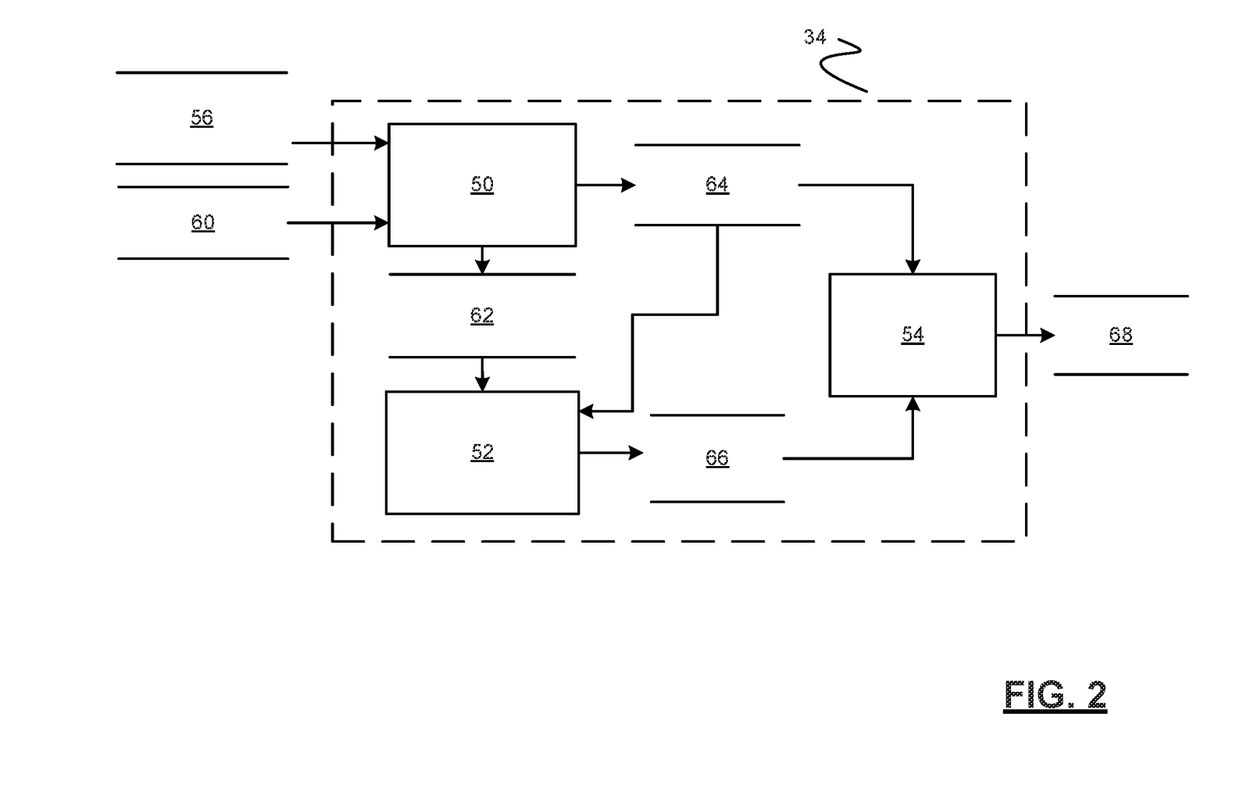
FIGS. 2 and 3 are dataflow diagrams illustrating the mapping system in accordance with various embodiments.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10. In various embodiments, controller 34 is configured to implement instructions of the mapping system 100 as discussed in detail below.

In various embodiments, the instructions, when executed by the processor, receive and process position information of the vehicle 10 and/or from other vehicles to determine static and dynamic lane information. The instructions build and store a map for use in controlling the vehicle 10 and/or other vehicles based on the static and dynamic lane information.

Figure 3:
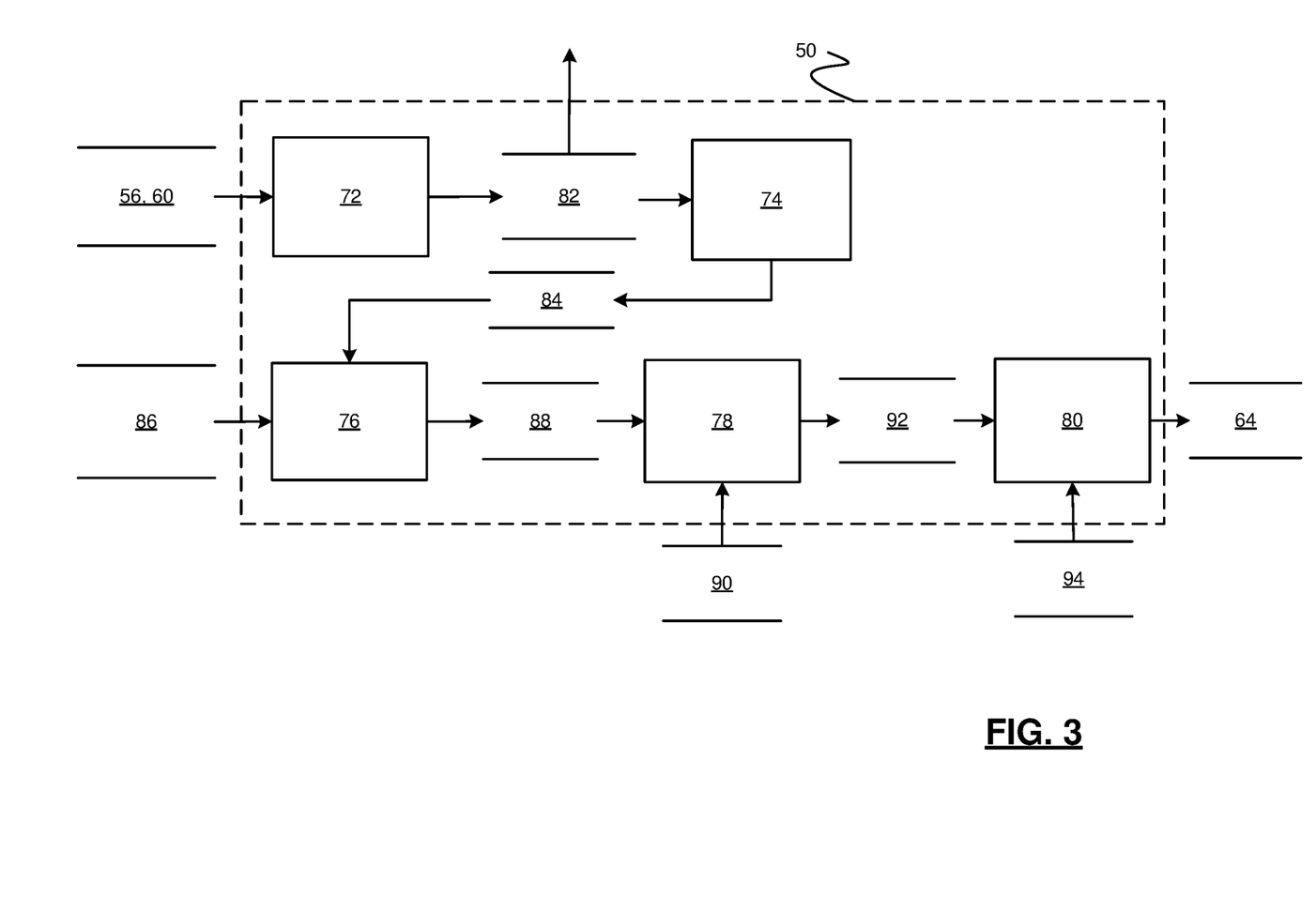
Figure 4:
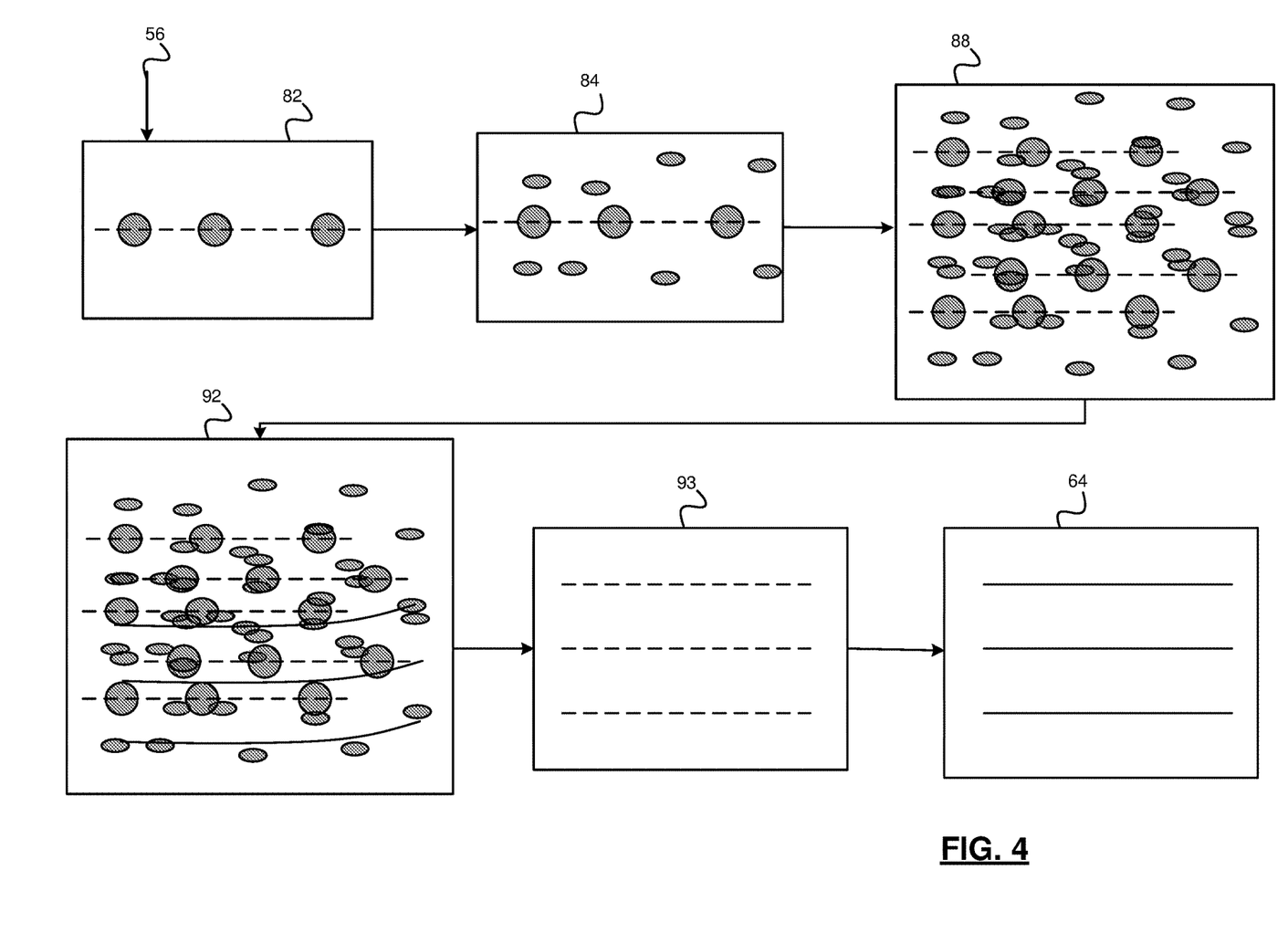
FIG. 4 is an illustration of example data produced by the mapping system in accordance with various embodiments.

With reference now to FIGS. 2-3 and with continued reference to FIG. 1, FIGS. 2-3 are dataflow diagrams illustrating aspects of the mapping system 100 in more detail. FIG. 4 is an illustration of the results from the dataflow in accordance with various embodiments. As can be appreciated, the modules and sub-modules shown in FIGS. 2-3 can be combined and/or further partitioned to similarly perform the functions described herein. Inputs to modules and sub-modules may be received from the sensor system 28, received from other control modules (not shown) associated with the vehicle 10, received from the communication system 36, and/or determined/modeled by other sub-modules (not shown) within the controller 34 of FIG. 1. The modules and sub-modules shown generally perform the functions of determining static and dynamic lane information and building a map for use in controlling the vehicle 10 based thereon. Thus, as shown in FIG. 2, the mapping system 100 includes a static data determination module 50, a dynamic data determination module 52, and a map generation module 54.

The static data determination module 50 receives position data 56 from the vehicle 10 and/or position data 60 from other vehicles. The position data 56, 60 can include, time series data from, for example, a GPS system. In such examples, the position data 56, 60 is processed to determine a GPS (latitude, longitude) trace $(x_t, y_t)$, GPS error margin trace $\delta_t$, and a probability distribution function of the GPS error $f_o(\sigma)$. In various embodiments, the position data 56, 60 further includes camera domain information including lane position $l_t$ and lateral distance offset $\Delta d_t$. Based on the received position data 56, 60, the static data determination module 50 determines static lane data including a topology of lanes and generates topology data 64 based thereon.

The dynamic data determination module 52 receives the topology data 64 and pre-processed data 62. The pre-processed data 64 includes vehicle position data 56 that has been processed as will be discussed in more detail below. Based on the received data 62, 64, the dynamic data determination module 52 determines dynamic lane data 66 of each lane identified in the topology data 64.

In various embodiments, the dynamic lane data 66 can include a current estimation of traffic conditions. In various embodiments, the dynamic data determination module 52 determines the current conditions based on historical data and temporal-spatial conditions.

For example, if the topology data 64 indicates that lanes A, B, and C are present, a historical average can be determined for each lane based on an accumulation of pre-processed data 62 associated with the lane dynamic lane data 66 previously determined to be associated with the lane. For example, historical data $f_{hist}(x, t)$ can be estimated as the average of points S in the lane minus any outlier points $S_{outlier}$ at time t as:

$$f_{hist}(x,t) = \text{avg}(S(x,t) - S_{outlier}(x,t)).$$

Historical data $f_{hist}(x, t)$ is used to calculate $f(x, t)$.

Thereafter, the current condition of the lane can then be estimated as:

$$\hat{f}(x,t) = \alpha f(x,t) + \beta \hat{f}(x,t-1).$$

Where $\alpha$ and $\beta$ represent parameters calculated from calibrations for the current estimation.

In various embodiments, the dynamic lane data 66 can take into account lane changes. A lane change can be detected, for example based on whether the road is a straight road or a curved road. In various embodiments, when the road is a straight road, the lane change can be detected when a steering pattern is identified (wavy, not straight), and a determined lateral shifting distance is greater than a threshold. In various embodiments, the lateral shifting distance L can be computed between points A and B as:

$$L = \Sigma_A^B (v(t) \sin \theta(t) \Delta t).$$

Where v represents the velocity and $\theta$ represents the angle between the straight road center line and the current direction at time t.

In various embodiments, when the road is a curvy road, the lane change can be detected based on a crowd sourced curvature of the lane divider in comparison to an expected yaw rate without changing lanes. The yaw rate can be computed, for example, as:

$$\overline{\omega} = \frac{v}{R} = \frac{v}{\frac{1}{N_s}\sum_{i\in S}\frac{vi}{\omega i}}$$

The lane change can be detected based on a shifting distance L in comparison to a threshold. The shifting distance can be computed as:

$$L(I) = \Sigma_{i=0}^{I} v\Delta t(i) \cdot \sin(\Sigma_{j=0}^{i}(\omega - \overline{\omega})\Delta t(j)).$$

In various embodiments, the dynamic lane data 66 can include indication of traffic congestion. The traffic congestion can be identified based on a comparison between probability distribution functions of speed in normal traffic conditions and abnormal traffic conditions. A severity of the traffic congestion can be indicated based on Jensen-Shannon divergency and Kullback-Leibler distance. For example, a lane-level congestion severity indicator can be used to identify which lane is less congested, and a vehicle can be advised to change into this less-congested, desirable lane, during the navigation instruction.

The map generation module 54 receives the topology data 64 and the dynamic lane data 66. The map generation module 54 generates map data 68 including a map that combines the lane topology with the dynamic lane information to provide an up-to-date representation of the navigable environment. The map may then be used by the controller 34 of the vehicle 10 to control one or more features of the vehicle 10.

With reference now to FIG. 3, the static data determination module is shown in more detail in accordance with various embodiments. In various embodiments, the static data determination module 50 includes a position data pre-processing module 72, a dilation module 74, an aggregation module 76, a clustering module 78, and a road geometry correction module 80.

The position data pre-processing module 72 processes the vehicle position data 56, 60 received from the vehicle 10 and/or other vehicles. The pre-processed data includes the GPS trace $(x_t, y_t)$, GPS error margin trace $\delta_t$, and a probability distribution function of the GPS error $f_o(\sigma)$.

The dilation module 74 receives the pre-processed data 82. The dilation module 74 dilates the position traces from the vehicle 10 and generates dilated data 84 based thereon. For example, for each sample point $(x_t, y_t)$, the dilation module generates N (e.g., 100 or some other integer number) pseudo points. The pseudo points can be generated based on the following relationships:

$$x_t^i = x_t + \Delta x^i$$

$$y_t^i = y_t \pm \Delta y^i$$

Where $(\Delta x^i, \Delta y^i) \sim f_o(\sigma)$.

The aggregation module 76 receives the dilated data 84 from the vehicle 10, and dilated data 84 from other vehicles. The aggregation module 76 aggregates the dilated traces 84, 86 from the different vehicles into a two-dimensional scatter plot and generates aggregated data 88 based thereon.

The clustering module 78 receives the aggregated data 88 and other data 90, for example, from the camera. The clustering module 78 clusters the aggregated data 88 and generates cluster data 92 based thereon. For example, the clustering module 78 defines initial cluster sets C corresponding to the number k of lanes as $\{C_1, C_2, C_3, \ldots C_k\}$. For each dilated point $S_i$ the aggregated data 88, the clustering module 78 assigns the point $S_i$ to a nearest cluster Cj based on a distance. For each cluster $C_j$, the clustering module 78 updates a center by finding the mean of all members in the cluster $C_j$. The clustering module 78 performs these steps until the k-mean algorithm converges.

In various embodiments, the clustering module 78 further clusters the aggregated data 88 based on a comparison of defined constraints to the information determined from the camera data 90, or from similar perception sensor sources such as lidar or radar. For example, various constraints can be defined for a set of lanes. Exemplary constraints can be, but are not limited to:
1. Car A and B are in the same lane.
2. Car A and C are in different lanes.
3. More weights for vehicle A in lane X.
4. Less weights for vehicle A with turning signal on and traveling on a straight road.
5. More weights for vehicle A with turning signal on and traveling on an edge lane.

In such embodiments, the clustering module 78 checks if the assignment to a cluster $C_j$ violates any constraints listed in constraints 1 or 2. If the assignment violates one of constraints 1 or 2, the dilated point $S_i$ is assigned to the next nearest cluster $C_{j+1}$. This check can be performed by the clustering module 78 until the assignment to a cluster does not violate the constraints.

In various embodiments, the clustering module 78 assigns weights to the points $S_i$ in each cluster $C_j$ based on the constraints 3, 4, and 5. The weights are then evaluated by the clustering module 78 in the k-mean algorithm. As can be appreciated, other constraints can be applied to the clustering, in various embodiments.

The road geometry correction module 80 receives the cluster data 92 and vehicle data 94. The vehicle data 94 can include, but is not limited to, vehicle yaw rate, vehicle position data, or other vehicle information indicating a physical position of the vehicle 10. The road geometry correction module 80 corrects the cluster data 92, including the center of the cluster, based on known road geometry and generates the topology data 64 based thereon.

In various embodiments, the road geometry correction module 80 corrects the cluster data 92 based on a mean squared error (MSE). In various embodiments the known road geometry can be indicated by the vehicle data 94. For example, when the yaw rate indicates the vehicle 10 is traveling in a straight line, the cluster data is corrected based on a road template function: y=ax and a MSE linear regression. In another example, when the yaw rate indicates the vehicle 10 is traveling along a curvy road, the cluster data 92 is corrected based on a road template function $y = \Sigma_0^k \beta_i * x^i$ and a MSE regression.

FIG. 4 illustrates a progression of the position data 56 into the topology data 64. As shown, the pre-processed data 82 is processed to provide dilated data 84. The dilated data 84 is aggregated with other data to produce aggregated data 88. The aggregated data 88 is clustered and constraints applied to provide cluster data 92. Lane data 93 is extracted from the cluster data 92 and road geometry correction is applied to the lane data 93 to provide the topology data 64 including the identification of the lanes.

Figure 5:
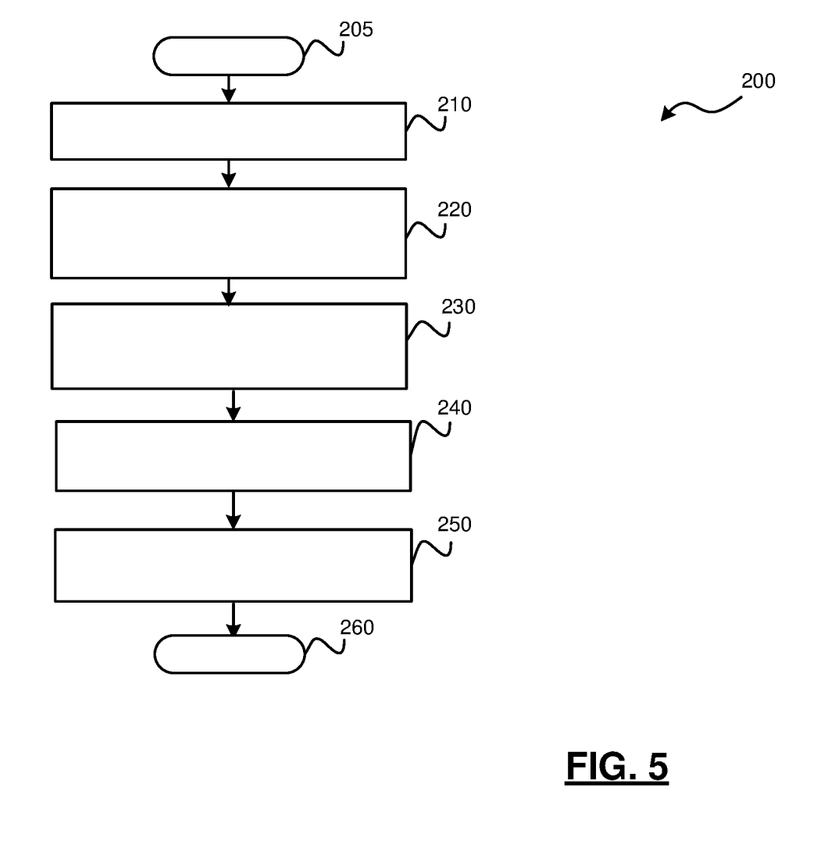
FIG. 5 is a flowchart illustrating mapping methods that can be performed by the mapping system in accordance with various embodiments.

With reference now to FIG. 5, a flowchart illustrates a mapping method that may be performed by the mapping system 100 (FIG. 1) in accordance with various embodiments. As can be appreciated in light of the disclosure, the order of operation within the method is not limited to the sequential execution as illustrated in FIG. 5 but may be performed in one or more varying orders as applicable and in accordance with the present disclosure. In various embodiments, the method 200 can be scheduled to run based on one or more predetermined events, and/or can run continuously during the operation of the vehicle 10.

The vehicle position data including GPS data, CAN bus trace data, camera data, lidar data, and/or radar data is received at 210. The vehicle position data is processed to determine a static topology of the lanes at 220, for example, as discussed above with regard to FIGS. 3 and 4. The vehicle position data is processed along with the topology of the lanes to determine traffic conditions in each lane at 230, for example, as discussed above with regard to FIG. 2. The map is generated based on the lane topology and the traffic conditions at 240 and the vehicle is controlled based on the map at 250. Thereafter, the method may end at 260.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, comprising:
receiving, by a processor, vehicle position data from the vehicle;
processing, by the processor, the vehicle position data with vehicle position data from other vehicles to determine a lane topology of lanes along a road, wherein the processing comprises:
pre-processing, by the processor, the vehicle position data to produce pre-processed vehicle position data, wherein the pre-processed vehicle position data includes a global positioning system (GPS) trace, a GPS error margin trace, and a probability distribution function of a GPS error;
dilating, by the processor, the pre-processed vehicle position data;
aggregating, by the processor, the dilated, pre-processed vehicle position data with pre-processed vehicle position data from the other vehicles;
clustering, by the processor, the aggregated vehicle position data to determine lanes;
correcting, by the processor, the road geometry of the determined lanes based on a yaw rate of the vehicle, a road template function and the clustered vehicle position data; and
determining, by the processor, the lane topology based on the corrected road geometry of the determined lanes;
processing, by the processor, the vehicle position data to determine traffic conditions within a lane of the lane topology; and
generating, by the processor, a map for controlling the vehicle based on the lane topology and the traffic conditions within the lane of the lane topology.

2. The method of claim 1, further comprising applying constraints to the clustered vehicle position data, and wherein the correcting the road geometry is based on the constrained clustered vehicle position data.

3. The method of claim 2, wherein the constraints are compared to data obtained from at least one of a camera and a lidar of the vehicle.

4. The method of claim 2, wherein the constraints include weights that are applied to the vehicle position data.

5. The method of claim 1, wherein the vehicle position data includes latitude and longitude traces of the vehicle from a global positioning system.

6. The method of claim 1, wherein the traffic conditions include temporal-spatial conditions based on a history of traffic conditions.

7. The method of claim 1, wherein the traffic conditions include an indication of traffic congestion.

8. The method of claim 1, wherein the traffic conditions include detected lane changes.

9. A system for controlling a vehicle, comprising:
a global positioning system that generates vehicle position data; and
a control module that, by a processor, receives the vehicle position data, processes the vehicle position data with vehicle position data from other vehicles to determine a lane topology, processes the vehicle position data to determine traffic conditions within a lane of the lane topology, and generates a map for controlling the vehicle based on the lane topology and the traffic conditions, wherein the control module processes the vehicle position data with the vehicle position data from the other vehicles to determine the lane topology by:
pre-processing, by the processor, the vehicle position data to produce pre-processed vehicle position data, wherein the pre-processed vehicle position data includes a global positioning system (GPS) trace, a GPS error margin trace, and a probability distribution function of a GPS error;
dilating, by the processor, the pre-processed vehicle position data;
aggregating, by the processor, the dilated, pre-processed vehicle position data with pre-processed vehicle position data from the other vehicles;
clustering, by the processor, the aggregated vehicle position data to determine lanes;
correcting, by the processor, the road geometry of the determined lanes based on a yaw rate of the vehicle, a road template function and the clustered vehicle position data; and
determining, by the processor, the lane topology based on the corrected road geometry of the determined lanes.

10. The system of claim 9, wherein the control module applies constraints to the clustered vehicle position data, and wherein the correcting the road geometry is based on the constrained clustered vehicle position data.

11. The system of claim 10, wherein the constraints are compared to data obtained from at least one of a camera and a lidar of the vehicle.

12. The system of claim 11, wherein the constraints include weights that are applied to the vehicle position data.

13. The system of claim 9, wherein the vehicle position data includes latitude and longitude traces of the vehicle from a global positioning system.

14. The system of claim 9, wherein the traffic conditions include temporal-spatial conditions based on a history of traffic conditions.

15. The system of claim 9, wherein the traffic conditions include an indication of traffic congestion.

16. The system of claim 9, wherein the traffic conditions further include detected lane changes.

17. A vehicle, comprising:
- a vehicle positioning system that provides vehicle position data;
- a communication system that receives vehicle position data from other vehicles; and
- a control module that, by a processor, receives the vehicle position data, processes the vehicle position data with vehicle position data from other vehicles to determine a lane topology, processes the vehicle position data to determine traffic conditions within a lane of the lane topology, generates a map for controlling the vehicle based on the lane topology and the traffic conditions, wherein the control module processes the vehicle position data with the vehicle position data from the other vehicles to determine the lane topology by:
  - pre-processing, by the processor, the vehicle position data to produce pre-processed vehicle position data, wherein the pre-processed vehicle position data includes a global positioning system (GPS) trace, a GPS error margin trace, and a probability distribution function of a GPS error;
  - dilating, by the processor, the pre-processed vehicle position data;
  - aggregating, by the processor, the dilated, pre-processed vehicle position data with pre-processed vehicle position data from the other vehicles;
  - clustering, by the processor, the aggregated vehicle position data to determine lanes of the road topology; and
  - correcting, by the processor, the road geometry of the determined lanes based on a yaw rate of the vehicle, a road template function, and the clustered vehicle position data.

* * * * *